US011086680B2

(12) United States Patent
Ogasawara

(10) Patent No.: US 11,086,680 B2
(45) Date of Patent: *Aug. 10, 2021

(54) OBJECT OPTIMAL ALLOCATION DEVICE, METHOD AND PROGRAM

(71) Applicant: INTERNATIONAL BUSINESS MACHINES CORPORATION, Armonk, NY (US)

(72) Inventor: Takeshi Ogasawara, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/353,625

(22) Filed: Mar. 14, 2019

(65) Prior Publication Data

US 2019/0213043 A1    Jul. 11, 2019

Related U.S. Application Data

(63) Continuation of application No. 14/669,831, filed on Mar. 26, 2015, now Pat. No. 10,296,388, which is a (Continued)

(30) Foreign Application Priority Data

Oct. 7, 2009   (JP) ................. 2009-233474

(51) Int. Cl.
    *G06F 9/50* (2006.01)
    *G06F 9/52* (2006.01)
    (Continued)

(52) U.S. Cl.
    CPC .......... *G06F 9/5016* (2013.01); *G06F 9/3009* (2013.01); *G06F 9/526* (2013.01);
    (Continued)

(58) Field of Classification Search
    CPC ............................... G06F 2212/2542
    (Continued)

(56) References Cited

U.S. PATENT DOCUMENTS

2002/0038301 A1*  3/2002  Aridor .................... G06F 9/465
2002/0056019 A1*  5/2002  Kolodner ............ G06F 12/0269
                                                                711/6
(Continued)

FOREIGN PATENT DOCUMENTS

JP          2000-099351 A     4/2000
JP          2000132406        5/2000
                  (Continued)

OTHER PUBLICATIONS

Hollingsworth et al., "NUMA-AwareJava Heaps for Server Applications", Parallel and Distributed ProcessingSymposium, Proceedings, 19the IEEE international Publication, 2005, pp. 108b.

(Continued)

*Primary Examiner* — Baoquoc N To
(74) *Attorney, Agent, or Firm* — Tutunjian & Bitetto, P.C.; Kurt Goudy

(57) ABSTRACT

A method, system and computer program product for optimally allocating objects in a virtual machine environment implemented on a NUMA computer system. The method includes: obtaining a node identifier; storing the node identifier in a thread; obtaining an object identifier of a lock-target object from a lock thread; writing a lock node identifier into the lock-target object; traversing an object reference graph where the object reference graph contains an object as a graph node, a reference from the first object to a second object as an edge, and a stack allocated to a thread as the root node; determining whether a move-target object contains the lock node identifier; moving the move-target object to a subarea allocated to a lock node if it contains the (Continued)

lock node identifier, and moving the move-target object to the destination of the current traversal target object if the lock node identifier is not found.

20 Claims, 5 Drawing Sheets

Related U.S. Application Data continuation of application No. 12/898,845, filed on Oct. 6, 2010, now Pat. No. 9,009,715.

(51) Int. Cl.
*G06F 9/30* (2018.01)
*G06F 12/14* (2006.01)

(52) U.S. Cl.
CPC ........ *G06F 12/145* (2013.01); *G06F 12/1475* (2013.01); *G06F 2212/1052* (2013.01); *G06F 2212/2542* (2013.01)

(58) Field of Classification Search
USPC .................................. 707/813–830
See application file for complete search history.

(56) References Cited

U.S. PATENT DOCUMENTS

| 2005/0086237 | A1* | 4/2005 | Monnie | G06F 9/544 |
| 2006/0143350 | A1* | 6/2006 | Miloushev | G06F 9/5088 |
| | | | | 710/242 |

FOREIGN PATENT DOCUMENTS

| JP | 2006-092532 A | 4/2006 |
| JP | 2006172495 | 6/2006 |
| JP | 20074506 | 1/2007 |
| JP | 2008-257594 A | 10/2008 |
| JP | 92009-211167 A | 9/2009 |

OTHER PUBLICATIONS

Kawachiya et al., "Lock Reservation: Java Locks Can Mostly Do Without Atomic Operations," ACM Conference on Object-Oriented Programming, Systems, Languages, and Applications, Nov. 4-8, 2002, pp. 130-141.

* cited by examiner

OBJECT OPTIMAL ALLOCATION DEVICE, METHOD AND PROGRAM

BACKGROUND OF THE INVENTION

The present invention relates to a technique of optimally allocating objects under virtual machine environment implemented in a non-uniform memory access (NUMA) computer system.

In recent years, processors have been designed based on non-uniform memory access ("NUMA"). Typical processors include IBM POWER6 (Registered Trademark), AMD Opteron (Registered Trademark), Sun Microsystems T2plus and Intel Nehalem. In these processors, memory is directly connected to the processor in order to reduce the gap between memory speed and processor speed which has been rapidly increasing due to multi-core design. A NUMA computer system includes multiple pairs (hereinafter, "nodes") of processors and memory, and the nodes are interconnected. In these NUMA computer systems, access to memory is asymmetrical among nodes. In other words, latency of a processor of a node to access memory of another node (hereinafter, "remote memory") is greater (typically two times greater) than the latency of the processor to access memory within its node (hereinafter, "local memory"). Therefore the allocation of memory data greatly influences performance in a NUMA computer system.

SUMMARY OF THE INVENTION

Accordingly, on aspect of the present invention provides a device that optimally allocates objects under virtual machine environment implemented on a non-uniform memory access (NUMA) computer system, the optimal allocation device including: a heap including a subarea allocated to a node; a stack allocated to a thread; a thread management unit adapted to obtain information on a processor running the thread; a lock management unit adapted to (1) obtain, from a lock thread requesting a lock on an object within the heap, an object identifier of a lock-target object from the lock thread requesting the lock on the lock-target object where (a) the lock-target object is within a lock heap and (2) write a lock thread identifier read from a lock thread structure of the lock thread into the lock-target object identified by the object identifier, where the lock thread identifier identifies the lock thread; and a memory management unit adapted (1) to traverse an object reference graph starting with a root node where the object reference graph contains (a) a first object contained within the heap as a graph node, (b) a reference from the first object to a second object within the heap as an edge, and (c) the stack as the root node, (2) to determine whether a header of a move-target object contains the lock thread identifier where the move-target object is referred to by a current traversal target, (3) to move the move-target object to a lock subarea within the lock heap allocated to a lock node identified by the lock thread identifier if the header of the move-target object contains the lock thread identifier, and (4) to move the move-target object to a destination subarea allocated to a destination node that is a destination of a current traversal target object if the lock thread identifier is not found in the move-target object.

Another aspect of the present invention provides a method for optimally allocating objects in a virtual machine environment implemented on a non-uniform memory access (NUMA) computer system, the method including the steps of: obtaining a node identifier of a node where the node includes a processor which is running a thread; storing the node identifier in a thread structure of the thread; obtaining an object identifier of a lock-target object from a lock thread requesting a lock on the lock-target object where the lock-target object is within a lock heap; writing a lock node identifier read from a lock thread structure of the lock thread into the lock-target object identified by the object identifier; traversing an object reference graph starting with a root node where the object reference graph contains (a) a first object contained within a heap as a graph node, (b) a reference from the first object to a second object within the heap as an edge, and (c) a stack allocated to a thread as the root node where the heap includes a subarea allocated to the node; determining whether a header of a move-target object contains the lock node identifier where the move-target object is referred to by a current traversal target; moving the move-target object to a lock subarea within the lock heap allocated to a lock node identified by the lock node identifier if the header of the move-target object contains the lock node identifier; and moving the move-target object to a destination subarea allocated to a destination node that is the destination of the current traversal target object if the lock node identifier is not found in the move-target object; where at least one of the steps is carried out using a computer device so that the objects are optimally allocated in a virtual machine environment implemented on the non-uniform memory access (NUMA) computer system.

Another aspect of the present invention provides a computer readable storage medium tangibly embodying a computer readable program code having computer readable instructions which when implemented, cause a computer to carry out the steps of: obtaining a node identifier of a node where the node includes a processor which is running a thread; storing the node identifier in a thread structure of the thread; obtaining an object identifier of a lock-target object from a lock thread requesting a lock on the lock-target object where the lock-target object is within a lock heap; writing a lock node identifier read from a lock thread structure of the lock thread into the lock-target object identified by the object identifier; traversing an object reference graph starting with a root node where the object reference graph contains (a) a first object contained within a heap as a graph node, (b) a reference from the first object to a second object within the heap as an edge, and (c) a stack allocated to a thread as the root node where the heap includes a subarea allocated to the node; determining whether a header of a move-target object contains the lock node identifier wherein the move-target object is referred to by a current traversal target; moving the move-target object to a lock subarea within the lock heap allocated to a lock node identified by the lock node identifier if the header of the move-target object contains the lock node identifier; and moving the move-target object to a destination subarea allocated to a destination node that is the destination of the current traversal target object if the lock node identifier is not found in the move-target object.

DETAILED DESCRIPTION OF THE PREFERRED EMBODIMENTS

Figure 1A:
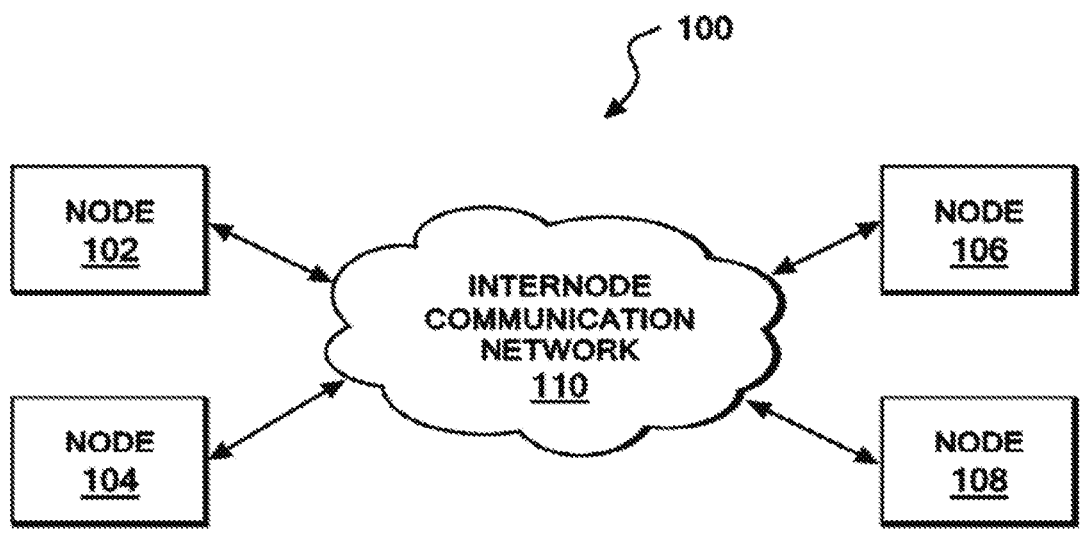
FIG. 1A is an upper-level configuration diagram illustrating main components of a NUMA computer system to which the present invention can be applied.

Applications written in Java (Registered Trademark) which are executed on a NUMA computer system have two types of optimization problems: (1) where should a JAVA virtual machine ("VM") allocate objects at the time of allocation and (2) where should the VM allocate the objects at the time of garbage collection (hereinafter, "GC"). A known conventional solution to the problem on where to allocate the objects at the time of the allocation is a method in which thread local allocation buffer is allocated from the local memory. For details on this solution, please see Hollingsworth et al., "NUMA-AwareJava Heaps for Server Applications", Parallel and Distributed Processing Symposium, 2005, Proceedings, 19th IEEE International Publication, pp. 108b ("Non Patent Literature 1"). This method is adopted in Sun Microsystem's HotSpot (Registered Trademark) VM.

However, the adoption of the above method is not sufficient for multithreaded applications where different threads can create an object and access the object. In a case where an object is often accessed by different threads such as when there are multiple worker threads for a single control thread, it is inappropriate to allocate the object to local memory at the time of the allocation.

Non Patent Literature 1 proposes object allocation by GC based on profiles of memory access. Specifically, pairs of an accessed memory address and a processor chip that accesses the memory are sampled by hardware, and traces thereof are stored. Further, the profiles of allocations of objects that have survived GC are collected, and traces are stored. These traces are merged to obtain, for each object, the processor chip that has accessed the object most frequently. The obtained processor chip is stored as a preferred location. Finally, at the time of GC, the surviving objects are moved to the preferred location.

Japanese Patent Application Publication No. 2000-132406 ("Patent Literature 1") discloses a technique with which data flow of a program is analyzed to find a part in the program where an object is referred to, and then an object release instruction is inserted into the end of the found object reference part.

Another conventional technique is disclosed in Japanese Patent Application Publication No. 2007-4506 ("Patent Literature 2"). Patent Literature 2 discloses a technique which detects, in advance, data that is not frequently moved by GC or the like and stores the data in a predetermined storage area, whereby data is moved less frequently. Accordingly load caused by GC and the like is reduced. Patent Literature 2 further discloses a technique with which long-lived data and short-lived data are distinguished from each other beforehand depending on data types, and storage areas for this data are reserved in different areas, so that the calculation amount is reduced and less data is moved during GC.

Another conventional technique is disclosed in Japanese Patent Application Publication No. 2006-172495 ("Patent Literature 3"). Patent Literature 3 discloses a technique which switches GC procedures depending on the amount of free space and used space. Patent Literature 3 further discloses a technique of selecting one of multiple garbage collection threads depending on the amount of free space or space used by the objects. The garbage collection threads each had different procedures such as detecting an object in the heap area of the memory that is not referred to by any object and releasing the memory area of the object as free memory space available for allocation of another object.

The approach disclosed by Non Patent Literature 1 increases the cost of GC by a factor of three in an example disclosed by Non Patent Literature 1. The factor for the GC cost increase is considered to be an essential element in this approach. According to the approach, pairs of information such as information on a memory position of the object before movement of the object and information on a preferred position where to move the object are required to be retained in the form of a hash table or the like that can be referred to upon GC. As a result, each movement of an object involves additional cost spent in referring to the information pair. This additional cost affects the entire GC cost.

The approach disclosed in Non Patent Literature 1 has ineffective sampling because samples of accesses to objects that are not alive upon GC are wasted. Accordingly, a sufficient number of objects cannot be optimally allocated because sampling without overhead is performed on only a portion of the objects to be moved.

None of the GC techniques disclosed in Patent Literatures 1 to 3 is developed based on virtual machine environment implemented on an NUMA computer system. With such GC techniques, objects cannot be optimally allocated under virtual machine environment implemented on an NUMA computer system.

The present invention is made in view of the above problems. An object of the present invention is to provide a technique of optimally and effectively allocating objects without an increase in GC cost under virtual machine environment implemented on an NUMA computer system.

Embodiments of the present invention are described below in detail according to drawings. However, the embodiment does not intend to limit the scope of the invention disclosed in claims. Further, all the combinations of features described in the embodiment are not necessarily required for the solution provided by the invention. Throughout the descriptions of the embodiment, the same components have the same signs.

In an embodiment of the present invention, one of the objects to be optimally allocated is those which are only exclusively accessed by threads. In order to allocate such objects optimally, identifiers of (1) processors or (2) nodes including the processors which are running the threads need to be recorded as information. This information is needed to determine optimal allocation positions for all objects that are exclusively accessed by the threads on critical sessions. However, if such identifiers are stored for every access to memory, run-time overhead is high. Hence, the process is not practical considering performance loss.

When an object requiring exclusive control is accessed, a lock on the object is obtained, and, in most cases, other objects accessed on the critical session with the lock can be traced via pointers from the locked object. When an object is locked, information on the processor running the thread that has required the lock is stored in the lock-target object, and the stored information on the processor is inherited by other objects referred to by the object.

As will be appreciated by one skilled in the art, aspects of the present invention may be embodied as a system, method or computer program product. Accordingly, embodiments of the present invention may take the form of an entirely hardware embodiment, an entirely software embodiment such as firmware, resident software, and micro-code, or an embodiment combining software and hardware aspects that may all generally be referred to herein as a "circuit," "module" or "system." Furthermore, embodiments of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A is an upper-level configuration diagram illustrating the main components of a NUMA computer system 100 according to the embodiment of the present invention. The computer system 100 includes multiple nodes 102, 104, 106 and 108. Although four nodes are illustrated in an exemplary system in FIG. 1, the number of nodes can differ in other cases. The nodes are connected with each other through an internode communication network 110 though which any node can communicate with any other node. An object of the internode communication network 110 is to enable communication among the components beyond node boundaries in order to enable a processor in any node to access memory in any other node.

In a preferred embodiment, the internode communication network 110 can be a fabric bus. Furthermore, the internode communication network 110 can be constructed with other various kinds of alternatives that have been or will be developed.

Figure 1B:
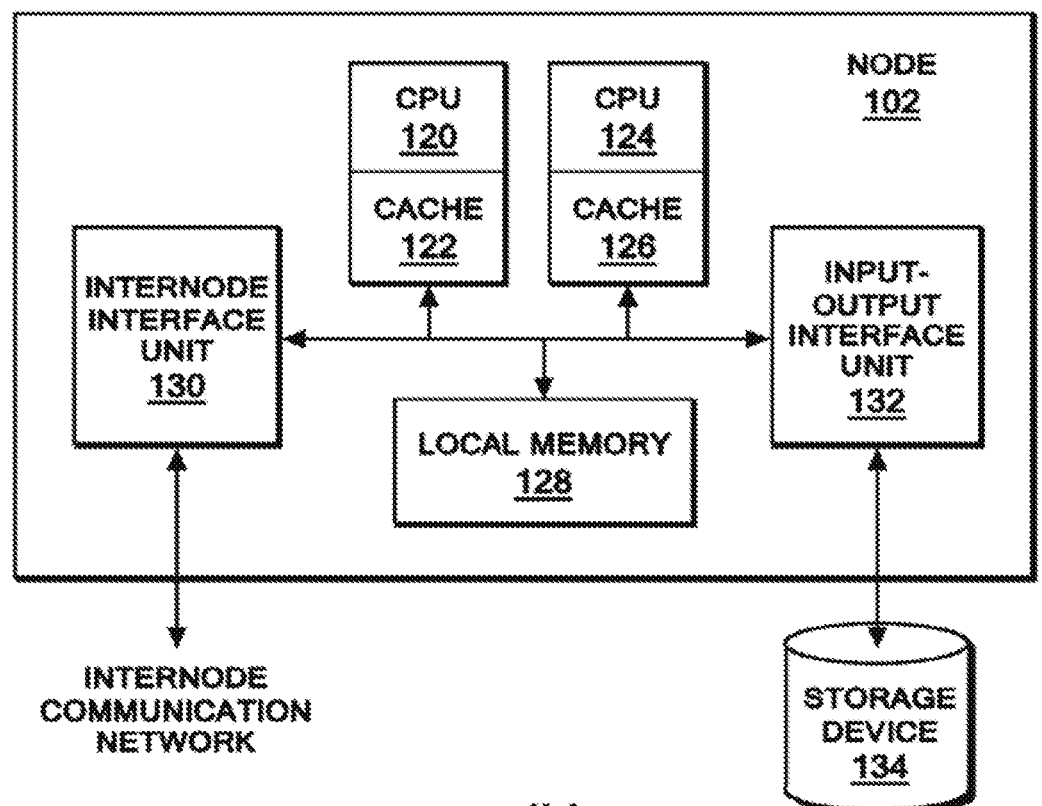
FIG. 1B is a configuration diagram of a typical node of the NUMA computer system illustrated in FIG. 1A.

FIG. 1B is a configuration diagram illustrating exemplary main hardware components of a typical node of the NUMA computer system 100 according to the preferred embodiment. Although a node is referred to with the reference sign "102" to provide a consistent description within the document, the node can be any one of the nodes 102, 104, 106 and 108. The node 102 includes central processing units (CPUs) 120 and 124 that perform basic machine processing functions according to instructions from the distributed main memory or other data. Throughout this document, the term "processor" is equivalent to "CPU", and these terms are not distinguished. The CPUs 120 and 124 respectively include, or control, caches 122 and 126 that temporarily store data and instructions therein.

In a large-scale multiprocessor computer system, caches are ordinarily implemented as multiple structures at multiple levels. For example, the CPU can include a level1 cache (L1 instruction cache) that exclusively stores therein instructions performed by the CPU, another physically separate level1 cache (L1 data cache) that exclusively stores therein data manipulated by the CPU other than the instructions, and a level2 cache (L2 cache) that stores therein both instructions and other data and is used for supplying to the L1 instruction cache and L1 data cache. In FIG. 1B, one or more cache structures are simplified and illustrated as independent blocks 122 and 126. Details on how a cache is implemented in each processor are not essential for the present invention. Other modifications are of course available, and the present invention is not limited to any one specific cache architecture. Furthermore, the present invention does not necessarily require usage of a cache.

The NUMA computer system 100 uses distributed main memory which includes independent local memory 128 for each node 102. The total amount of the addressable main memory within the NUMA computer system 100 is the sum of addressable local memory 128 within the nodes. All CPUs within the entire NUMA computer system 100 share the same addressable distributed main memory. The real address space of the distributed main memory is invariable in the entire NUMA computer system 100. A certain memory position of the local memory 128 has a unique real address that indicates the same address to all processors and nodes.

An internode interface unit 130 connects the node 102 to the internode communication network 110, whereby the node 102 can communicate with other nodes in the NUMA computer system 100. The internode interface unit 130 can include a cache or buffer for temporarily storing therein data that is transferred among the nodes.

An input-output interface unit 132 provides communication to one or more input-output devices (storage device 134 in FIG. 1B) via one or more input-output buses. The input-output bus can be any type of bus that is suitable for communication with conventional input-output devices such as a direct access storage device (DASD), a tape device, a workstation, a printing device, a remote device or a remote communication adapter for communication with other computer systems using a dedicated communication wire or network. For example, the input-output bus can be an industry standard PCI bus. Note that not all the nodes 102 need to include the input-output interface unit 132 or the input-output device connected to it.

An internal node bus 136 provides communication among various components of the node 102. Specifically, in response to a memory access from one of the CPUs 120 and 124, the internal node bus 136 transfer data between the local memory 128 and a corresponding one of the caches 122 and 126 of the CPUs 120 and 124. Monitoring the logic of the local memory 128, the internode interface unit 130, the internal node bus 136 or the both determine whether each real address requested by a memory access is included in the local memory 128 of the node 102 or included in the local memory of another (remote) node. Depending on the case, the memory access is relayed to the local memory 128 or the internode interface unit 130 to communicate with the remote node.

The access to the real address of the local memory 128 passes through the internal node bus 136 and returns in relatively small machine cycles. In contrast, the access to the real address in the local memory of the remote node passes through the internal node bus 136 of the request-side node, the internode interface unit 130 of the request-side node, the internode communication network 110, the internode interface unit 130 of the response-side node, and the internal node bus 136 of the response-side node. As a result, the memory access to the remote node generally takes relatively large cycles.

FIG. 1A illustrates the NUMA computer system 100 including four nodes, while FIG. 1B illustrates a typical node including two CPUs and various other components. FIGS. 1A and 1B merely illustrate a simplified example of a possible configuration of the NUMA computer system. The number or type of the devices can be different under such a configuration, and the NUMA computer system 100 can include other devices that are not illustrated. Further, all the nodes are not necessarily the same and the number of CPUs or the amount of addressable local memory is not necessarily the same among all the nodes.

Figure 2:
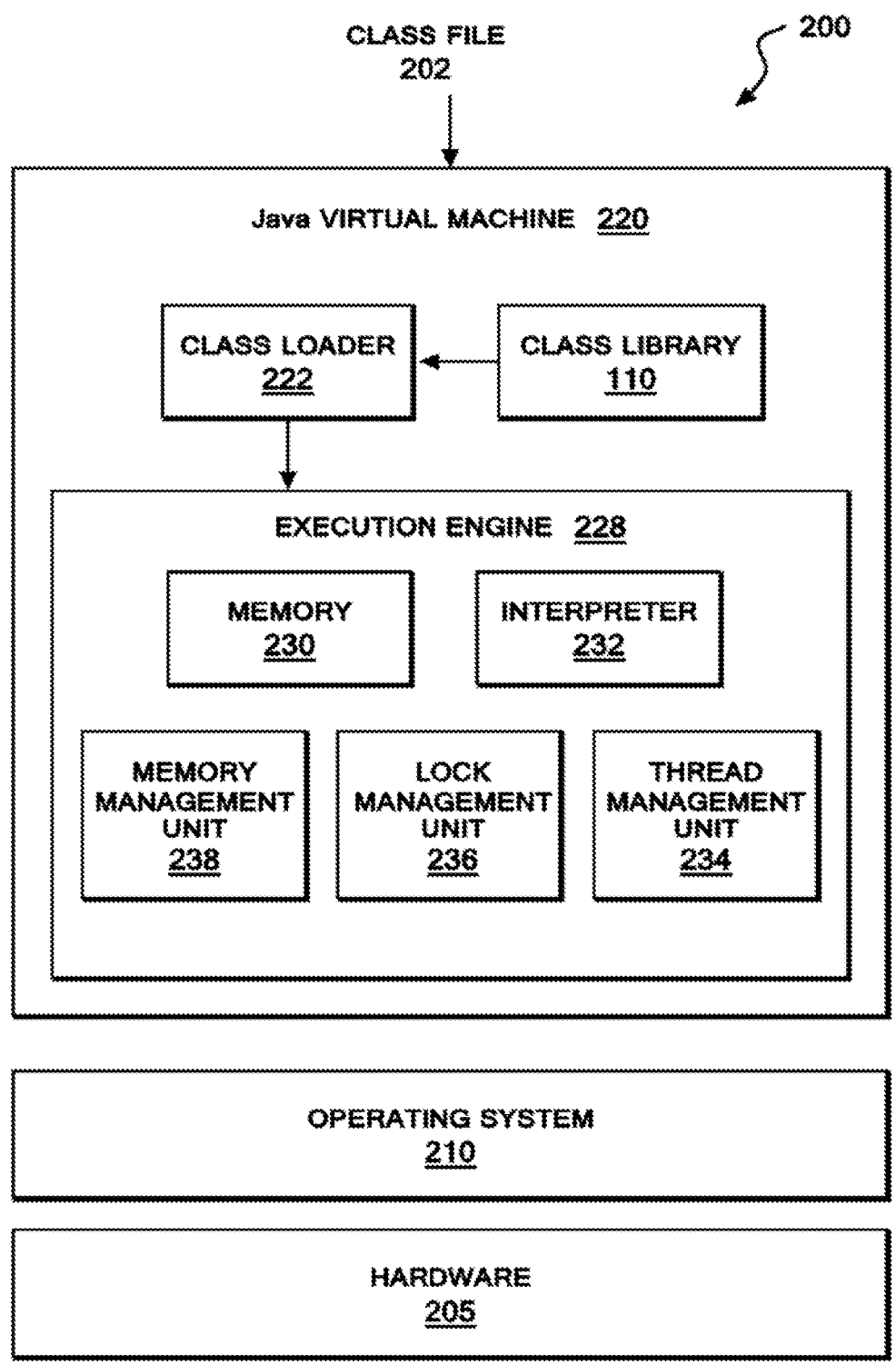
FIG. 2 is a functional block diagram of Java runtime environment according to an embodiment of the present invention.

FIG. 2 is a functional block diagram of runtime environment according to the embodiment of the present invention. The runtime environment according to the present invention is implemented using hardware 205 described as the NUMA computer system with reference to FIG. 1. FIG. 2 illustrates Java runtime environment. Although a Java runtime environment is taken as an example for the description, the present invention can be applied to other platforms such as Common Language Runtime (CLR) and can be applied to other shared runtime environment providing services such as a class library and GC.

The Java language is a language created by Sun Microsystems, Inc. Information on Java software tools and Java developer tools is available on the online URL http://www-.sun.com/java. Since the way of using Java and creating a Java application and Java applet is well known in the technical field, the detailed description is omitted in this document. The Java source code written by a software developer is compiled into byte code, an intermediate format that can be executed by any system having the runtime environment. The Java byte code is transferred, as a class file 202 described later, from the local hard disk (see the storage device 134 in FIG. 1B) or other computer systems to a Java virtual machine 220 via the input-output interface unit 132.

The Java virtual machine 220 is a platform in which a Java application or a web browser in the case of a Java applet can be run under any system regardless of an operating system 210 and lower-level hardware 205. The Java virtual machine 220 receives a program in a format of the machine-independent Java byte code and converts the program into machine-dependent native statements. Then, the Java virtual machine 220 runs these converted native statements using the processor in one of the nodes, which are described above with reference to FIG. 1B, directly or via the operating system 210. Such an operating system 210 is for example an AIX (Registered Trademark) operating system or a Linux (Registered Trademark) operating system.

The Java byte code created from the Java source code is constituted by one or more classes. These classes are allocated while the computer program is run by the virtual machine 220. The classes provide templates of objects to be used. The classes are integrated into the class file 202 including executable byte codes and data corresponding to the executable byte codes. The class file 202 can include other kinds of information on objects. The class file 202 is created by a Java compiler on the basis of the Java source code. Because the Java source code, the Java compiler, and the class file are well known in the technical field, the detailed description is omitted in this document.

A class loader 222 obtains one or more Java class libraries from a class library 224 in order to perform a predetermined action specified by the Java byte code in the class file 202. The class loader 222 dynamically loads the class file 202 and the obtained one or more Java class libraries by storing these in the memory 230 of an execution engine 228. Before storing in the memory 230, the class loader 222 can run a class verification using a method well-known in the technical field to verify that items to be stored conform to Java security.

In response to the class file 202 being loaded by the class loader 222, an interpreter 232 interprets the Java byte codes included in each class file 202 one by one and performs a corresponding action. Thus, one or more threads are run by the processor in the node 102.

The interpretation and execution of the Java byte code by the interpreter 232 are well known functions in the technical field, and thus the detailed description is omitted in this document. The execution engine 228 can include a just-in-time (JIT) compiler (not illustrated) in addition to the interpreter 232. The JIT compiler converts all the series of Java byte codes before executing them so that the runtime overhead is avoided and, accordingly, runtime speed is improved. Because the JIT compiler is well known in the technical field, the detailed description is omitted in this document.

The memory 230 includes multiple defined storage areas that are roughly classified into a stack or heap. These storage areas are used by the interpreter 232 for executing the Java byte code. The stack is used for supporting multithread and is a storage area allocated for each thread every time a thread is started. The memory 230 further includes a program counter (PC) register.

In general, the stack of the Java virtual machine 220 is implemented with a last-in first-out (LIFO) data structure. A data unit of the stack is called "frame". The frames store (1) an array of local variables of a method executed by a thread, (2) a stack for retaining data being processed (Operand Stack), and (3) a reference to a runtime constant pool of a class of the method. When a method is started by a thread, a frame is stacked onto a stack, and the called method becomes active. When the process of the method is finished, the corresponding frame is deleted and the calling method becomes active again.

The heap is a storage area shared by all threads, and is allocated when the virtual machine 220 is started. The heap includes an area for storing therein dynamic data such as an object instance to be checked in GC and an area, referred to as "method area", for storing static data such as a class structure. In an embodiment of the present invention, the storage area of the heap to be checked in GC includes multiple subareas. Each subarea is allocated to a node 102 including the subarea in a part of or the entire local memory 128. Note that the position, size, and number of the subareas are dependent on the operating system 210 and the Java virtual machine 220, whereby multiple subareas can be allocated to a single node 102.

For each of the threads, the thread management unit 234 obtains information on a processor that runs the thread. Preferably, the thread management unit 234 obtains, as the information on a processor that runs the thread, the identifier of a node including the processor, and then the identifier is written into a thread structure of the thread. The storage position of the thread structure of each thread is dependent on the operating system 210 and the Java virtual machine 220.

In order to obtain the identifier of a node, machine instructions can be used if supported. If such machine instructions cannot be used, a processor ID is obtained using a system call, and then the obtained processor ID is converted into the node identifier according to a correspondence table. From the viewpoint of cost, it is preferable that the system call be performed with some interval time. For example, the system call can be performed when a certain point of code called "safe point" executed now and then is executed, or when a thread allocates an object allocation buffer.

The thread management unit 234 can support multiple threads that are run in parallel. Specifically, the thread management unit 234 can manage creation of threads by creating an object of a thread and calling the start method for the created thread to run the thread. The thread management unit 234 can support priority execution of a thread by using a priority level.

The lock management unit 236 manages locks of each object in order to solve conflicts that are caused when two or more threads try to access the same object. Since the lock management unit 236 manages the locks, when a thread has a lock, other threads attempting to obtain the same lock are blocked. When the lock is released by the thread that had the lock, the lock becomes available to the blocked thread.

In general, exclusive control of shared resource is realized using the concept of lock and critical region. The critical region is the executable code part in which resource (e.g., object) shared among threads is used. Each thread obtains the lock before entering the critical region, executes the code, and releases the lock before leaving the critical region. In this way, the lock is obtained by only a single method at a time.

In the Java source code, the critical region is specified using a synchronized modifier. The synchronized modifier included in the Java source code is converted into byte code. Specifically, the synchronized modifier included in the Java source code is converted into the monitorenter byte code to obtain the lock on the object, or converted into the monitorexit byte code to release the lock obtained through the monitorenter instruction.

The lock management unit 236 performs the processes described below as implementation of the monitorenter byte code and the monitorexit byte code. In monitorenter byte code, the lock management unit 236 obtains, from a thread requesting the lock on an object in the heap, the identifier of the thread and the identifier of the lock-target object. The lock management unit 236 then writes the identifier of the thread into the header of the object identified with the identifier of the object. Specifically, the lock management unit 236 uses a compare-and-swap (CAS) instruction to write the identifier of a thread into a lockword of the header of the object.

As the implementation of the monitorexit byte code, the lock management unit 236 obtains, from a thread requesting release of an object in the heap, the identifier of the lock-target object. Then, the lock management unit 236 clears the identifier of the thread that had been written into the header of the object identified with the identifier of the object. Specifically, the lock management unit 236 uses the CAS instruction to clear the identifier of the thread that had been written into the lockword of the header of the object.

The lock management unit 236 can support lock reservation. The lock reservation is a function with which an owner of an object is fixed to a thread in a case where the lock is frequently requested. In the case of the lock reservation, in addition to writing the thread identifier into the lockword of the lock-reservation-target object, the lock management unit 236 further sets a reservation bit indicating that the lock is reserved. When a lock is requested on the object, the lock management unit 236 checks the thread identifier and the reservation bit in the lockword. The lock reservation can spare the CAS instruction and which reduces the cost of the lock. For details on lock reservation, please see Kawachiya et al., "LockReservation: Java Locks Can Mostly Do Without Atomic Operations", ACMConference on Object-Oriented Programming, Systems, Languages, and Applications (OOPSLA 2002), pp. 130-141, Nov. 4-8, 2002.

The thread identifier written into the header of the object by the lock management unit 236 is used by a later-described memory management unit 238 in order to obtain processor information written into a thread structure by the thread management unit 234. This processor information preferably contains the identifier of a node including the processor. However, the thread identifier written into the lockword of the object is cleared upon releasing of the lock as described above. In this case, the memory management unit 238 cannot obtain the processor information. Meanwhile, in the object for which the lock reservation is made, the thread identifier written into the lockword remains without being cleared for a relatively long time. However, the lock reservation never occurs for an application with a flat profile which does not include any prominently hot code.

Preferably, in response to a lock request from a thread, the lock management unit 236 performs an overwrite by writing the identifier of the thread or the processor information that has been obtained by the thread management unit 234 for the thread into a predetermined position of the lock-target object or a predetermined position pointed to by a pointer of the object. The processor information would preferably contain the identifier of a node including the processor. Upon writing the processor information, the lock management unit 236 specifies a thread structure from the thread identifier of the thread requesting the lock, and reads processor information stored by the thread management unit 234 by use of the specified thread structure.

Here, the predetermined position of the object can be located inside the header of the object. In a case where the area for storing the thread identifier or the node identifier (three-bit area for eight nodes) can be reserved in the lockword, the lock management unit 236 writes the thread identifier or the node identifier into the lockword by executing the CAS instruction. If such an area cannot be reserved in the lockword, the lock management unit 236 writes the thread identifier or the node identifier into a part other than the lockword by executing an instruction other than the CAS instruction. The predetermined position pointed to by the pointer of the lock-target object can be a position that is independent from the object and located within free space in an area pointed to by the pointer of the object such as a monitor structure used in one implementation of the monitorenter called "fatlock".

As described above, the thread identifier or the node identifier, which is written into the predetermined position of the object or the predetermined position pointed to by the pointer of the object, is overwritten every time a lock is requested on the object. In other words, the thread identifier or the node identifier, which is written into the predetermined position of the object or the predetermined position pointed to by the pointer of the object, is not cleared upon releasing of the lock. In this way, the later-described memory management unit 238 can always obtain the thread identifier or the node identifier written into the predetermined position of the object or the predetermined position pointed to by the pointer of the object, and hence can identify the node including the processor that has accessed the object most recently.

The memory management unit 238 performs the optimal allocation of the object by traversing the object reference graph. Here, the memory management unit 238 can function as a garbage collector which reuses an area of a heap of one or more objects that are not reached as a result of the traversal of the object reference graph. In this example, the memory management unit 238 can perform the optimal allocation of objects when GC is started in response to an event where available free space is not left in the heap. The memory management unit 238 implemented as a function of the garbage collector is described in the embodiment. The garbage collector is a process by which an area in the on-memory heap that is no longer in use becomes reusable.

The memory management unit 238 described above can map each of subareas in a heap to a corresponding node. As described, in an embodiment of the present invention, the GC-target storage area in a heap is divided into multiple subareas, and each subarea, including the subareas on the entire or a part of local memory 128, is allocated to the node 102. The memory management unit 238 can perform mapping among these subareas and nodes. In response to a request for memory of a node, the memory management unit 238 can find a free block from the subareas allocated to the node and return the free block.

Figure 3A:
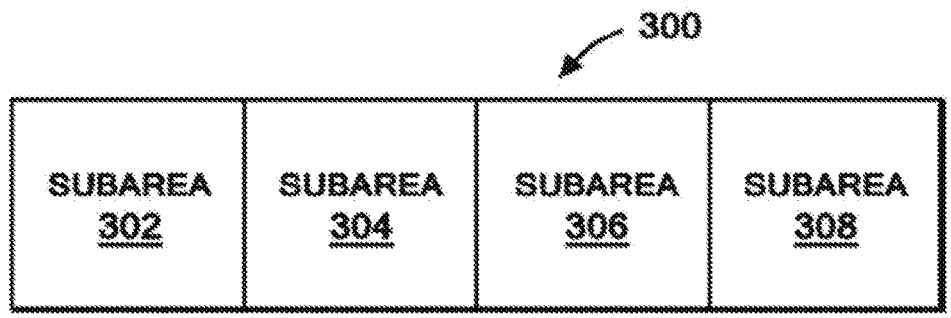
FIG. 3A is a diagram illustrating an exemplary heap.

FIG. 3A illustrates an example of a GC-target storage area 300 in a heap, where the storage area 300 is divided into subareas 302 to 308. The free blocks can be managed using a conventional memory management method. Some examples of conventional basic memory management methods are a reference counting method, a mark-and-sweep method, and a copying method. The memory management is not necessarily performed for each subarea independently but can be performed for the entire heap targeted for GC.

With the counting method, each object includes a counter indicating how many times the object is referred to by other objects. The counter of each object is incremented by one every time the object is referred to and is decremented by one every time reference to the object is finished. When the value of a counter is zero, this indicates that an object including the counter is not referred to from anywhere, which accordingly means that the object is no longer needed. In this case, the object including the counter is released.

The mark-and-sweep method uses a mark table containing multiple areas, each corresponding to the objects in the heap. Firstly, all areas in the mark table are cleared and initialized. The area is marked when the corresponding object is referred to by other objects, and the mark is cleared when the reference is finished. When the heap runs out of free space, the mark table is checked, and objects corresponding to unmarked areas are released.

The copying method divides the area of the heap into a From area and To area. If an object in the From area is to be maintained, the object is copied to the To area. As a result, the To area includes only survived objects that are not regarded as unnecessary. In the next operation, the current From area serves as the To area while the To area serves as the From area, and this switching operation is repeated thereafter.

The management method for the free blocks is not limited to the basic algorithm described above. For example, the management method can be other application algorithms such as a generation GC which considers the trends of life spans of objects. However, it should be noted that when the memory management unit 238 in an embodiment of the present invention traverses the object reference graph to discover the memory area that is no longer needed, the stack allocated to each thread as a root node, which is a start point of traversal, is preferentially traversed. Then, the objects are optimally allocated on the basis of the traversal.

Specifically, to perform the optimal allocation, the memory management unit 238 traverses the object reference graph including the stack allocated to each thread as a root graph node. The root graph node is a start node to traverse. At this time, the memory management unit 238 determines whether the thread identifier is included in the header of the move-target object, which is an object referred to by the current traversal target. If the thread identifier is found, the memory management unit 238 identifies the thread from the thread identifier and obtains, from the processor information, the information of the node including the processor running the identified thread. Then, the memory management unit 238 moves the move-target object to a subarea allocated to the node. In contrast, if the thread identifier is not found in the header of the move-target object, the memory management unit 238 moves the move-target object to one of the subareas mapped on the node that is a destination node of the current traversal-target object, including the local memory. If the current traversal-target object is a stack which is the root node, the object should be moved to a subarea allocated to a node including the processor running the thread that has the stack.

The object reference graph traversed to perform the optimal allocation includes: each object in the heap as a graph node; reference from one object to another object as an edge; and a stack allocated to each thread as a root node. The object reference graph can be created on the basis of the reference information included in each object. The header of each object includes information from which class information of the object can be identified. The class information includes information indicating the storage location of such reference information.

Figure 3B:
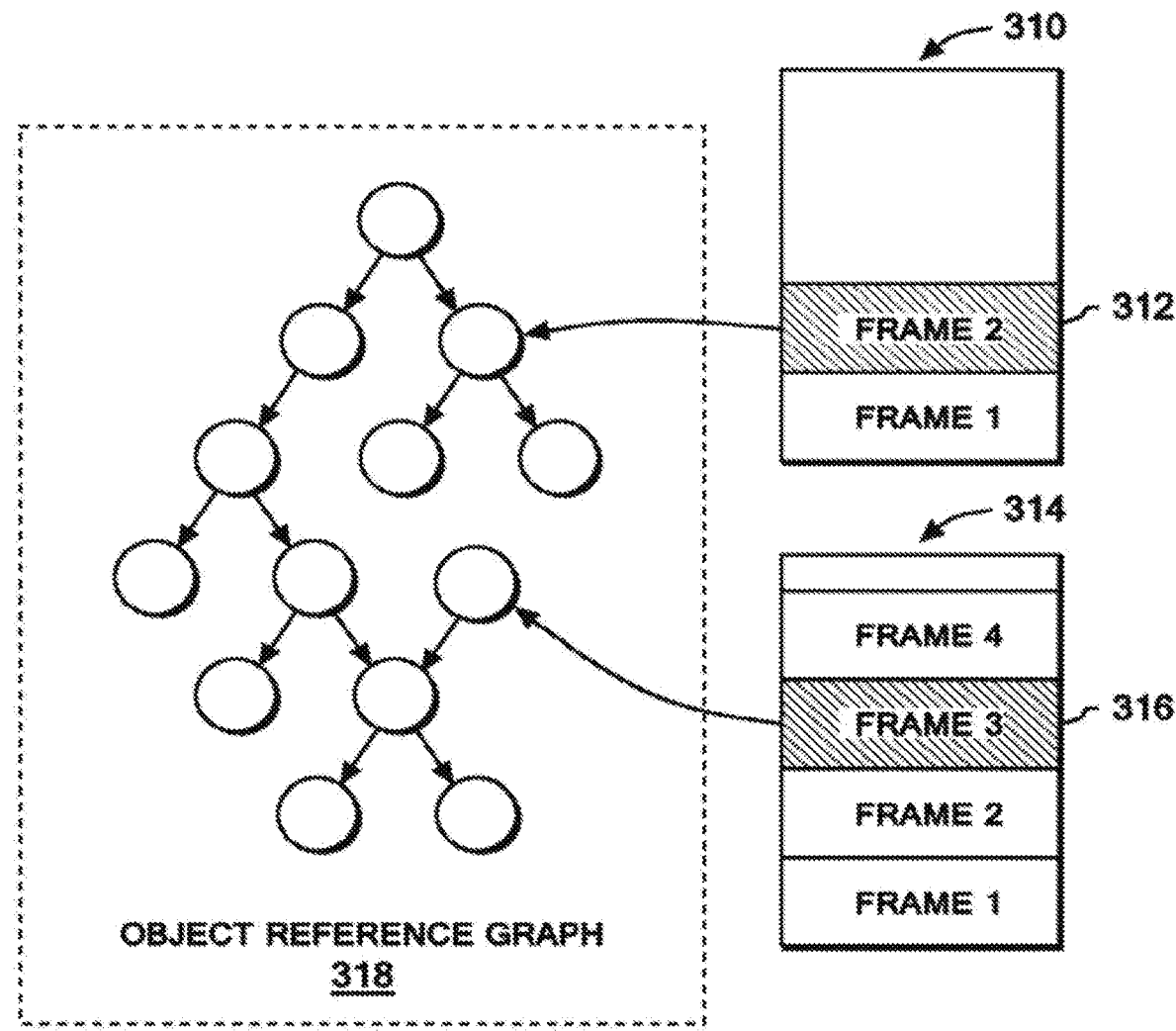
FIG. 3B is a diagram illustrating exemplary relation between an object reference graph and a stack.

In an embodiment of the present invention, each of multiple object reference graphs is traversed starting with root nodes. The objects are allocated optimally on the basis of the traversal. FIG. 3B illustrates an example of how the object reference graph 318 corresponds to the stacks 310 and 314. Frames are stacked onto the stacks 310 and 314 illustrated in FIG. 3B. As illustrated by an arrow in FIG. 3B, the frames 312 and 316 include references from the local variables in the stack to the objects in the object reference graph 318. As described, the stack includes the local variables for referring to the objects in the heap. Hence, in this embodiment of the present invention, the optimal allocation is performed by traversing the object reference graph including a stack as a root node.

When the thread management unit 234 stores, as the processor information, the identifier of the node including the processor into the thread structure of the corresponding thread, the memory management unit 238 performs the optimal allocation as follows. If the thread identifier is included in the header of the move-target object that is referred to by the current traversal target, the memory management unit 238 obtains the node identifier from the thread structure of the thread identified with the identifier of the thread. Then, the memory management unit 238 moves the move-target object to the subarea allocated to the node identified with the node identifier. If the thread identifier is not included in the header of the move-target object that is referred to by the current traversal target, the memory management unit 238 refers to the destination of the current traversal target and moves the move-target object to the current traversal target's destination accordingly. Specifically, the memory management unit 238 moves the move-target object to one of subareas allocated to the node including the local memory which is the destination of the current traversal target.

When the lock management unit 236 responds to a lock request from a thread and performs an overwrite by writing the thread identifier, the node identifier or both into the predetermined position in the lock-target object or the predetermined position pointed to by the pointer of the object, the memory management unit 238 performs the optimal allocation as follows. Here, the node identifier is obtained by the thread management unit 234 from the processor information for the thread. If the thread identifier or the node identifier is found in the predetermined position in the move-target object referred to by the current traversal target or the predetermined position pointed to by the pointer of the object, the memory management unit 238 moves the move-target object to a subarea allocated to the node identified with the node identifier. As described previously, the memory management unit 238 obtains the node identifier from the thread structure if the thread identifier is found in the predetermined position. If neither the thread identifier nor the node identifier is found in the predetermined position in the move-target object or the predetermined position pointed to by the pointer of the object, the memory management unit 238 moves the move-target object to the destination of the current traversal target. Specifically, the memory management unit 238 moves the move-target object to any one of subareas allocated to the node including the local memory of the destination of the current traversal target.

The memory management unit 238 is run on a CPU of any one of nodes in the NUMA computer system 100 and is implemented by a thread that calls a memory management module. Similarly, the lock management unit 236 is run on a CPU of any one of nodes in the NUMA computer system 100 and is implemented by a thread that calls a lock management module. The thread management unit 234 is also run on a CPU of any one of nodes in the NUMA computer system 100 and is implemented by a thread that calls a thread management module.

Figure 4:
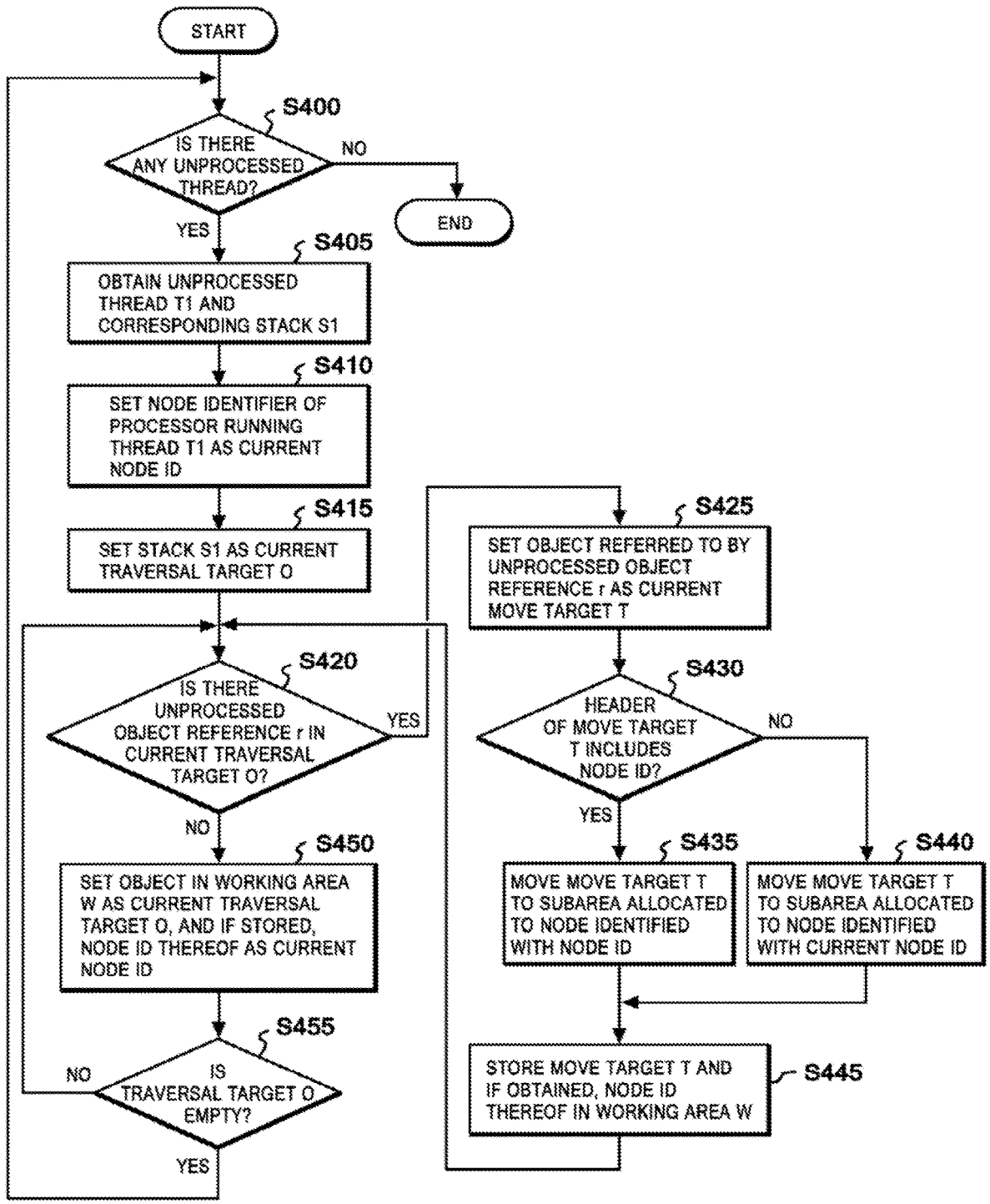
FIG. 4 is a flow chart illustrating an exemplary flow of an object optimal allocation process performed by a memory management unit 238 according to the embodiment of the present invention.

The flow of the optimal object allocation process performed by the memory management unit 238 according to the embodiment of the present invention is described below with reference to the flow chart illustrated in FIG. 4. The optimal allocation process in FIG. 4 is performed at the same time as or around the same time as GC, every time GC is started. When the optimal allocation process is started, a thread structure of each of the threads includes information on a processor running the thread or preferably the identifier of the node including the processor due to the process performed by the thread management unit 234. When an object in the heap is to be locked by a thread, the header of the object includes the identifier of the thread requesting the lock or the processor information described above.

In FIG. 4, the process begins at S400. The memory management unit 238 determines whether there are any unprocessed threads yet to be targeted in the optimal allocation process, in the multiple threads run by each of the processors in the NUMA computer system 100. If any unprocessed threads are found, in which case, Step 400 would be "YES", in step 405 the memory management unit 238 obtains an unprocessed thread T1 and sets a stack S1 allocated to the thread T1 as the root node which is the traversal start point, of the object reference graph.

The memory management unit 238 then obtains the identifier of a node including the processor running the thread T1 from the processor information stored in the thread structure of the thread T1. The node identifier is set as the current node ID, which is a variable used for the inheritance of the destination of the parent object in step 410. In step 415, the memory management unit 238 sets the stack S1 as the current traversal target O.

In step 420, the memory management unit 238 then determines whether there is an unprocessed object reference r yet to be targeted in the process, within the current traversal target O. If there is an unprocessed object reference r, in which case step 420 would be "YES", in step 425, the memory management unit 238 sets the object referred to by the unprocessed object reference r as a current move target T. In step 430, the memory management unit 238 determines whether the header of the move target T includes thread identifier or processor information such as a node ID.

If the thread identifier or the processor information such as the node ID is found in the header, in which case step 430 would be "YES", the memory management unit 238 obtains, using the method described above, the node of the processor running the thread identified with the thread identifier on the basis of the thread identifier or the processor information such as the node ID in the header. In step 435, the memory management unit 238 moves the object being the move target T to the subarea allocated to the node.

If neither the thread identifier nor the processor information is found in the header in which case step 430 would be "NO", in step 440, the memory management unit 238 moves the object being the move target T to a subarea allocated to the node identified with the current node ID. The process proceeds to Step 445 from Step 435 or Step 440. The memory management unit 238 stores the move target T in a working area W. At this time, if the node ID is obtained in step S435, in step 445, the node ID is associated with the object being the move target T. Then, the process returns to step 420.

If the unprocessed object reference r is not found in the current traversal target O at step 420, the memory management unit 238 sets an object stored in the working area W that has not yet been set as a traversal target O as the current traversal target O. If a node ID is stored in the working area W in association with the current traversal target O, in step 450, the node ID is set as the current node ID. In step 455, the memory management unit 238 then determines whether the traversal target O is empty or not.

If the traversal target O is not empty, in which case step 455 would be "NO", the process returns to step 420. In contrast, if the traversal target O is empty in which case step 455 would be "YES", the process returns to the first step 400. Note that as long as there is an object left in the working area W that is not yet set as the traversal target O, steps 450 and 455 are repeated on the object even if the traversal target O is empty at step 455. If there are no unprocessed threads in the first step 400 after returning from step 455, the process is terminated.

Figure 5A:
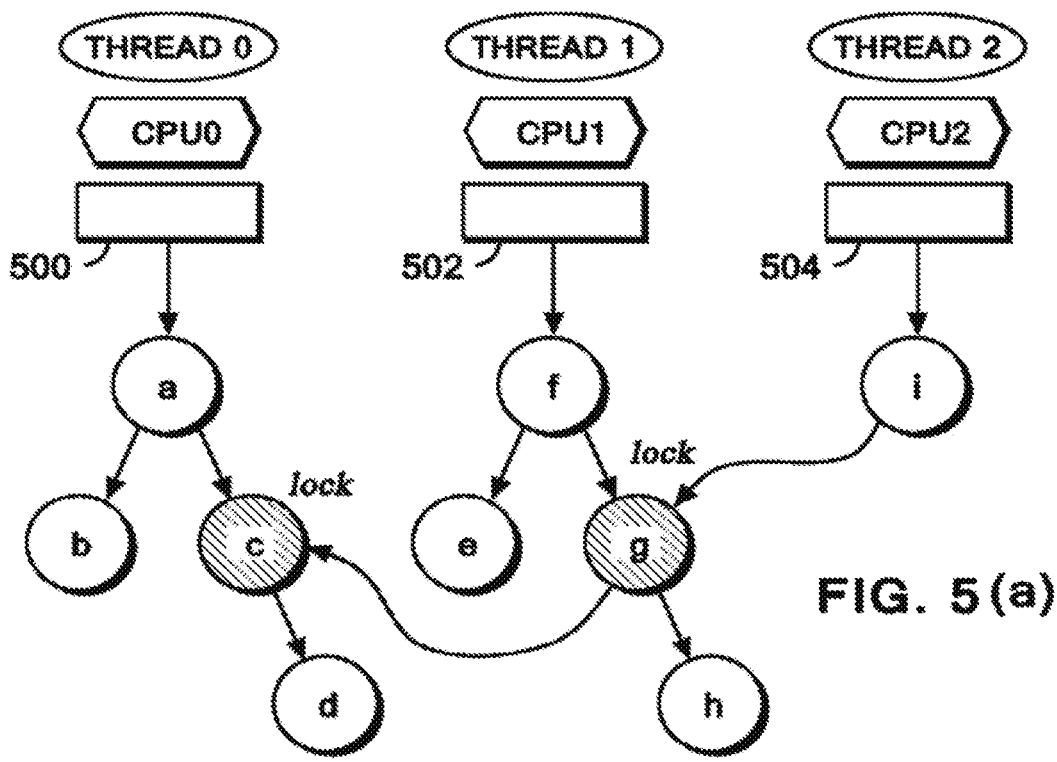
FIG. 5A is a diagram illustrating an exemplary locked state of objects in the object reference graphs while an application is run.

FIG. 5 describes the object optimal allocation process performed by the memory management unit 238. FIG. 5A illustrates an exemplary lock state of objects in object reference graphs while an application is run before the object optimal allocation process is performed. In FIG. 5A, the rectangular shapes with reference signs 500, 502, and 504 represent stacks allocated to a thread 0, thread 1, and a thread 2 that are run by a CPU 0, a CPU1, and a CPU 2, respectively. Each graph represents an object reference graph. The circles with letters a to i each represent a node which is an object. The solid arrow represents reference from a stack/object to an object.

In FIG. 5A, the object of the node c is locked by the thread 0 run by the CPU 0. Accordingly, an identifier of the thread 0 is stored within the header of the object in node c. A node identifier of the node including the CPU 0 can also be stored within the header of the object of the node. Meanwhile, the object of the node g is locked by the thread 1 run by the CPU 1. An identifier of thread 1 is also stored within the header of the object of the node g. Accordingly, a node identifier of the node including CPU 1 can also be stored within the header of the object of the node g.

Assume a case where, under such a locked state, there is no more free space in any of the subareas allocated to a node, and the memory management unit 238 performs an object optimal allocation process or the memory management unit 238 performs garbage collection. As described above, in the object reference graph being traversed for the object optimal allocation process, the stack allocated to each thread is regarded as the root node. Specifically, the memory management unit 238 traverses three object reference graphs 506, 508 and 510 illustrated in FIG. 5B starting with stacks 500, 502 and 504 regarded as the root nodes. The object reference graphs are traversed in the order of 506, 508 and 510.

In traversing the object reference graph 506, the memory management unit 238 first sets the stack 500 as the current traversal target, and sets the ID of the node of the CPU 0 running the thread 0 allocated to the stack 500 as the current node ID. The current ID is a variable used for the inheritance of the destination of the parent object. The memory management unit 238 then determines whether or not the thread identifier or the node identifier is stored in the header of the object a that is a move-target object referred to by the stack 500. Because the object a is not a lock target, the header does not include the thread identifier nor the node identifier. The memory management unit 238 moves the object a to a subarea that is allocated to the node identified with the current node ID. At this time, the memory management unit 238 stores the object a in the working area W.

Because no other object is referred to by the stack 500, the traversal proceeds to the next step. The memory management unit 238 obtains the object a that is not yet regarded as a lock target from the working area W, sets the object a as the current traversal target, and repeats the same process. The object a refers to two other objects: b and c. Of the two objects, the object b is not a lock target, and the header of the object b does not include the thread identifier or the node identifier. The memory management unit 238 causes the object b to inherit the destination of its parent object a, the optimal allocation position, and moves the object b to a subarea that is allocated to a node identified with the current node ID. At this time, the memory management unit 238 stores the object b in the working area W.

The object c, which is the other object referred to by the current traversal-target object a, is a lock target as illustrated in FIG. 5A. The header of the object c includes a thread identifier and can further include a node identifier. On the basis of the thread identifier or the node identifier in the header, the memory management unit 238 obtains the node of the CPU 0 running the thread 0 that has locked the object c. At this time, the memory management unit 238 stores the object c and the ID of the node including the CPU 0 in the working area W in association with each other.

Because no other object is referred to by the object a, the traversal proceeds to a next step. The memory management unit 238 obtains the object b that is not yet regarded as a traversal target from the working area W, sets the object b as the current traversal target, and repeats the same process. Because the object b is empty and does not refer to other objects, the memory management unit 238 obtains the object c that is not yet regarded as a traversal target and its corresponding node ID from the working area W, and sets them as the current traversal target and the current node ID, respectively.

The memory management unit 238 determines whether or not the thread identifier or the node identifier is stored in the header of a move-target object d that is referred to by the object c. Because the object d is not a lock target, the header does not include a thread identifier or a node identifier. The memory management unit 238 causes the object d to inherit the destination of its parent object c, the optimal allocation position, and moves the object d to a subarea that is allocated to a node identified with the current node ID. Because no other object is referred to by the object c and the object d is empty, the process of the memory management unit 238 is terminated.

Figure 5B:
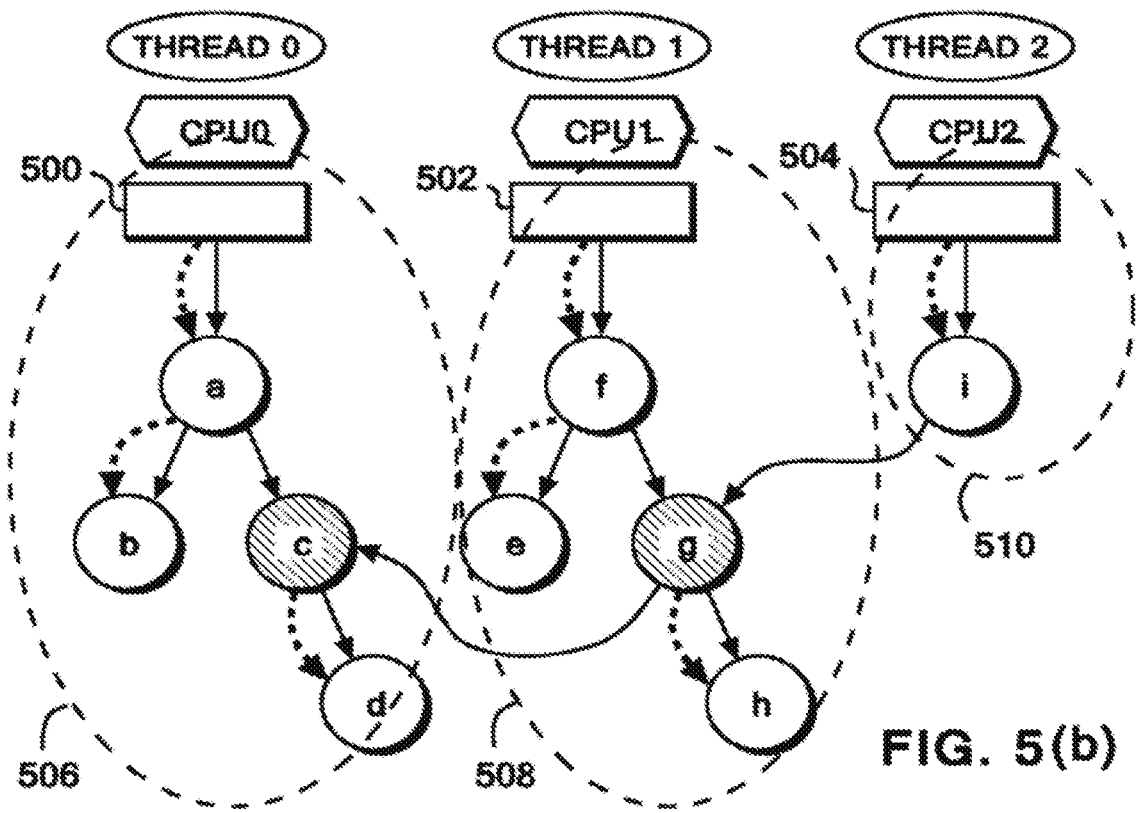
FIG. 5B is a diagram illustrating an example of how the optimal allocation position information is inherited.

If the object optimal allocation is performed similarly in the object reference graphs 508 and 510, the optimal allocation position is inherited from the parent object to the child object in the end as illustrated in the dotted arrow in FIG. 5B. Specifically, other than the lock-target objects c and g, each object inherits the optimal allocation position of its parent object and is moved to the local memory of the node of the parent object. Each of the lock-target objects c and g is moved to a subarea that is allocated to a node of the processor running the thread that has most recently requested the lock to the object. In a real environment, the order in which the memory management unit 238 traverses the stacks is independent of the structure of the graph. If the memory management unit 238 first starts traversal from stack 502, it reaches nodes c and d and assigns an optimal node ID to these nodes, or the node including CPU 0, while the traversal started from CPU 1. Thus this algorithm can assign an optimal node ID to each object by using the processor information of a lock target.

This embodiment of the present invention was applied to a 4.7 GHz POWER6 (Registered Trademark) constituted by eight nodes (chips), and the additional GC cost and performance improvement were evaluated. As a result, the performance improvement was confirmed without an increase in the GC cost. This experiment used an industry standard SPECpower_ssj2008 benchmark.

The present invention is described according to the embodiment. However, the technical scope of the present invention is not limited to the description according to the embodiment described above. The embodiment can be varied or modified in various ways as it is well known to those skilled in the art. Embodiments with such variations and modifications are naturally within the technical scope of the present invention.

According to an embodiment of the present invention, objects that are exclusively accessed by threads via critical sessions are allocated optimally. According to an embodiment of the present invention, objects can be optimally allocated under virtual machine environment implemented on an NUMA computer system in an effective, efficient, and exhaustive manner. When an object is locked, information on the optimal allocation position is obtained and stored in the object. In this way, no additional cost is required for obtaining optimal allocation position information, and thus objects can be allocated optimally without increasing GC cost. Other effects of the present invention can be understood from the descriptions on the embodiments.

The invention claimed is:

1. A device for optimally allocating objects, using a hardware processor operatively coupled to a non-transitory computer-readable storage medium, under virtual machine environment implemented on a non-uniform memory access (NUMA) computer system, the optimal allocation device comprising:
   a heap comprising a subarea allocated to one or more nodes in an internode network;
   a stack allocated to a thread;
   a lock management unit adapted to:
      obtain an object identifier of a lock-target object from a lock thread requesting a lock on said lock-target object; and
      write a lock thread identifier read from a lock thread structure of said lock thread into said lock-target object; and
   a memory management unit adapted to:
      move a move-target object to a lock subarea within said lock heap allocated to a lock node identified by said lock thread identifier if said header of said move-target object contains said lock thread identifier; and
      move said move-target object to a destination subarea allocated to a destination node that is a destination of a current traversal target object if said lock thread identifier is not found in said move-target object.

2. The device according to claim 1, wherein:
   said lock management unit is further adapted to, every time a lock is requested from said lock thread, perform an overwrite by writing a lock node identifier, which is the processor information obtained for said lock thread by said thread management unit, into a predetermined position of said lock-target object or a predetermined position pointed to by a pointer in said lock-target object; and
   said memory management unit is further adapted to determine the destination of said move-target object by using a node identifier in a predetermined position in said move-target object or a predetermined position pointed to by a pointer in said move-target object.

3. The device according to claim 1, wherein:
   said lock management unit is further adapted to, every time a lock is requested from said lock thread, perform an overwrite by writing a lock thread identifier of said lock thread into a predetermined position in said lock-target object or a predetermined position pointed to by a pointer in said lock-target object; and
   said memory management unit is further adapted to determine a destination of said move-target object by using said lock thread identifier in said predetermined position in said move-target object or said predetermined position pointed to by said pointer in said move-target object.

4. The device according to claim 1, wherein said memory management unit further comprises:
   a garbage collector that reuses an area of an object heap of an object that is not reached as a result of traversal of object reference graphs wherein traversal of said object reference graphs is performed in parallel with, before or after garbage collection is performed in response to an event where said object heap runs out of available free space.

5. The device according to claim 2 wherein:
said predetermined position of said lock-target object or said predetermined position pointed to by said pointer in said lock-target object is a position in a lockword in said lock-target object; or
said predetermined position in said move-target object or said predetermined position pointed to by said pointer in said move-target object is a position in a lockword in said move-target object.

6. The device according to claim 3 wherein:
said predetermined position of said lock-target object or said predetermined position pointed to by said pointer in said lock-target object is a position in a lockword in said lock-target object; or
said predetermined position in said move-target object or said predetermined position pointed to by said pointer in said move-target object is a position in a lockword in said move-target object.

7. The device according to claim 1, further comprising:
a thread management unit adapted to obtain a node identifier of said node containing said processor running said thread, and to write said node identifier into a thread structure of said thread, wherein said memory management unit is further adapted to obtain said node identifier, and to move said move-target object to said subarea allocated to said node identified with said node identifier if said thread identifier is found in said header of said move-target object that is referred to by said current traversal target.

8. The device according to claim 1, wherein said subarea comprises at least a part of a local memory.

9. The device according to claim 1, wherein an object reference graph contains a first object contained within said heap as a graph node, a reference from said first object to a second object within said heap as an edge, and said stack as a root node.

10. A method for optimally allocating objects, using a hardware processor operatively coupled to a non-transitory computer-readable storage medium, in a virtual machine environment implemented on a non-uniform memory access (NUMA) computer system, the method comprising:
storing a node identifier of one or more nodes in an internode communication network in a thread structure of said thread;
obtaining an object identifier of a lock-target object from a lock thread requesting a lock on said lock-target object;
writing a lock node identifier read from a lock thread structure of said lock thread into said lock-target object identified by said object identifier;
moving a move-target object to a lock subarea within a lock heap allocated to a lock node identified by said lock node identifier if said header of said move-target object contains said lock node identifier; and
moving said move-target object to a destination subarea allocated to a destination node that is the destination of a current traversal target object if said lock node identifier is not found in said move-target object.

11. The method according to claim 10 wherein said subarea comprises at least a part of the local memory.

12. A non-transitory computer readable storage medium tangibly embodying a computer readable program code having computer readable instructions which when implemented using a hardware processor, cause a computer to carry out the steps of a method comprising:
storing a node identifier of one or more nodes in an internode network in a thread structure of a thread;
obtaining an object identifier of a lock-target object from a lock thread requesting a lock on said lock-target object;
writing a lock node identifier read from a lock thread structure of said lock thread into said lock-target object identified by said object identifier;
determining whether a header of a move-target object contains said lock node identifier;
moving said move-target object to a lock subarea within a lock heap allocated to a lock node identified by said lock node identifier if said header of said move-target object contains said lock node identifier; and
moving said move-target object to a destination subarea allocated to a destination node that is the destination of the current traversal target object if said lock node identifier is not found in said move-target object.

13. The method according to claim 10, wherein every time a lock is requested from said lock thread, an overwrite is performed by writing a lock node identifier, which is the processor information obtained for said lock thread by said thread management unit, into a predetermined position of said lock-target object or a predetermined position pointed to by a pointer in said lock-target object; and
wherein the destination of said move-target object is determined by using a node identifier in a predetermined position in said move-target object or a predetermined position pointed to by a pointer in said move-target object.

14. The method according to claim 10, further comprises reusing an area of an object heap of an object that is not reached as a result of traversal of object reference graphs using a garbage collector, wherein said traversal of said object reference graphs is performed in parallel with, before or after garbage collection is performed in response to an event where said object heap runs out of available free space.

15. The method according to claim 13, wherein:
said predetermined position of said lock-target object or said predetermined position pointed to by said pointer in said lock-target object is a position in a lockword in said lock-target object; or
said predetermined position in said move-target object or said predetermined position pointed to by said pointer in said move-target object is a position in a lockword in said move-target object.

16. The method according to claim 10, further comprising:
obtaining a node identifier of said node containing said processor running said thread, and writing said node identifier into a thread structure of said thread, wherein said memory management unit is further adapted to obtain said node identifier, and to move said move-target object to said subarea allocated to said node identified with said node identifier if said thread identifier is found in said header of said move-target object that is referred to by said current traversal target.

17. The method according to claim 10, wherein said subarea comprises at least a part of a local memory.

18. The method according to claim 10, wherein an object reference graph contains a first object contained within a heap as a graph node, a reference from said first object to a second object within said heap as an edge, and a stack allocated to a thread as a root node wherein said heap comprises a subarea allocated to said node.

19. The non-transitory computer readable storage medium as recited in claim 12, wherein an object reference graph includes a first object contained within a heap as a graph node, a reference from said first object to a second object within said heap as an edge, and a stack allocated to a thread as a root node wherein said heap comprises a subarea allocated to said node.

20. The non-transitory computer readable storage medium as recited in claim 12, wherein said subarea comprises at least a part of a local memory.

* * * * *